Patented Apr. 13, 1954

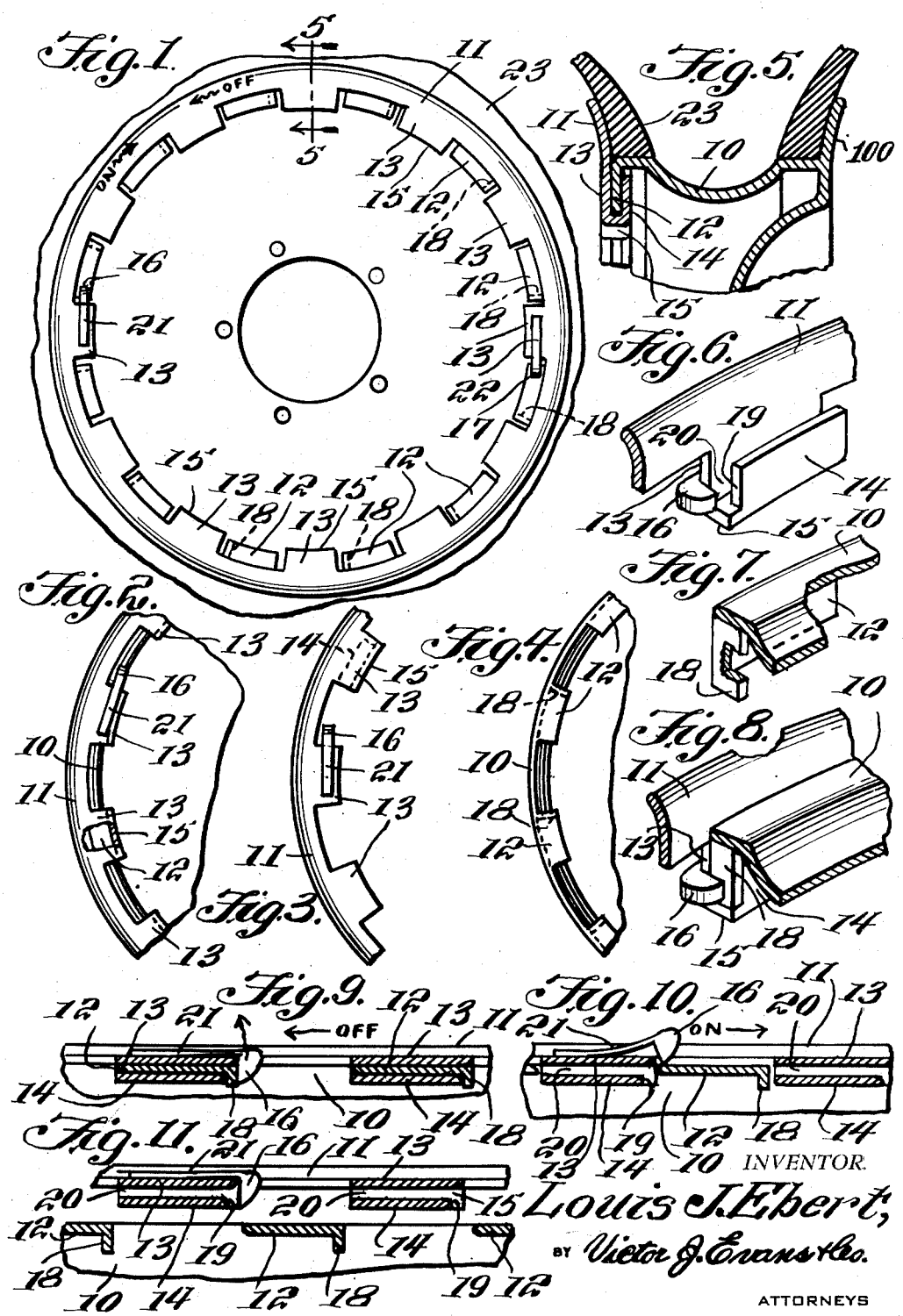

2,675,048

UNITED STATES PATENT OFFICE 2,675,048

SEPARABLE AND DEMOUNTABLE TIRE RIM

Louis J. Ebert, Little Valley, N. Y.

Application June 6, 1952, Serial No. 292,155

1 Claim. (Cl. 152—412)

This invention relates to motor vehicle wheels of the demountable rim type, and in particular a rim having a separable flange on one side and with U-shaped locking elements extended inwardly from the flange and positioned to slide over spaced inwardly extended lugs on the edge of the rim for locking the flange to the rim at spaced points extended continuously around the rim.

The purpose of this invention is to provide means for securely locking a separable flange on a demountable rim whereby the flange is secured to the rim at a plurality of spaced points and wherein the flange is secured in position with locking dogs.

Various devices have been provided for mounting separable flanges on demountable rims of motor vehicle wheels, however, where the flanges and rims are provided with interlocking elements it is difficult to positively secure the parts assembled without bolts, or other mechanical locking elements. With this thought in mind this invention contemplates a separable flange having spaced U-shaped sections depending from the inner edge thereof, with the sections positioned to slide over inwardly extended lugs on the adjoining edge of the rim and with spring actuated locking elements mounted on the separable flange and positioned to snap over stops on the lugs of the rim for positively locking the flange on the rim.

The object of this invention is, therefore, to provide means for combining spring actuated locking dogs with spaced locking elements of flanges of demountable rims whereby the flanges are positively secured to the rims.

Another object of the invention is to provide means for securing separable flanges of demountable rims to the rims without screws, bolts, or other mechanical locking elements.

A further object of the invention is to provide an improved demountable motor vehicle rim having a separable flange secured, at a plurality of points, to the rim, in which the rim is of a simple and economical construction.

With these and other objects and advantages in view the invention embodies a rim for a motor vehicle wheel having an integral flange on one side with a separable flange on the opposite side and with U-shaped locking elements positioned in spaced relation and extended inwardly from the flange and wherein said U-shaped locking elements are adapted to slide over lugs extended inwardly from the rim whereby with the parts secured in assembled relation with spring actuated dogs the separable flange is locked to the rim.

Other features and advantages of the invention will appear from the following description taken in connection with the drawing, wherein:

Figure 1 is a side elevational view showing the rim and web of a motor vehicle wheel with parts of the tire broken away.

Figure 2 is a detail showing part of the wheel rim shown in Fig. 1 illustrating the separable flange in the locked position on the rim.

Figure 3 is a detail similar to that shown in Fig. 2 showing the flange with the rim omitted.

Figure 4 is a detail also similar to that shown in Fig. 2 showing the rim with the flange omitted.

Figure 5 is a typical cross section taken on line 5—5 of Fig. 1 showing the rim of the wheel with the parts assembled, and with parts of the tire and rim broken away.

Figure 6 is a detail showing one of the U-shaped locking sections of the flange with the spring actuated dog extended across the locking section for preventing a lug of the rim of a wheel sliding out of the section.

Figure 7 is a detail showing a section of the rim and illustrating a flange providing a stop at the ends of the lugs extended inwardly from the edge of the rim.

Figure 8 is a detail showing the rim and flange assembled with the dog positioned against the stop.

Figure 9 is a detail showing a longitudinal section through a portion of the rim showing the locking dog in the position of securing a lug of the rim in the U-shaped locking elements of the flange.

Figure 10 is a section similar to that shown in Fig. 9 showing the locking dog moved outwardly to release the lug of the rim of the wheel and showing the lug extended from the slot of the locking element of the flange.

Figure 11 is an exploded view similar to the view shown in Figs. 9 and 10 showing the flange separated from the rim.

Referring now to the drawing wherein like reference characters denote corresponding parts the improved demountable rim of this invention includes a rim 10, an integral flange 100, a removable flange 11, spaced lugs 12 extended inwardly from the rim, meshing U-shaped elements having outer walls 13, inner walls 14 and connecting sections 15 extended inwardly from the flange and positioned to receive the lugs 12, locking dogs 16 and 17 and stops 18 extended from the ends of the lugs 12.

The inner walls 14 terminate at the point 19 whereby the ends of the walls are spaced from the ends of the sections 15 and outer walls 13 providing a notch for receiving the stops 18 of a lug positioned to extend into the groove 20 of the U-shaped section.

The dogs 16 and 17 are carried on the ends of resilient arms 21 and 22, respectively and the ends of the arms are secured to the outer faces of the walls 13 by welding or other suitable means.

With the parts formed in this manner the flange 11 is removed by withdrawing the dogs 16 and 17 to positions, as illustrated in Fig. 10 whereby the flange 11 may be rotated in a counterclockwise direction with the U-shaped sections sliding off of the lugs 12 of the rim. With the U-shaped sections positioned between the lugs 12 the flange is free and may readily be removed from the rim.

In assembling the flange on the rim the U-shaped sections are pressed through the spaces between the lugs 12 with the upper edges of the flange against a tire, as indicated by the numeral 23 and with the flange in position, as illustrated in Fig. 5 it is turned in a clockwise direction whereby the lugs 12 enter the slots 20 of the U-shaped members with the dogs 16 and 17 riding over the outer faces of the lugs, as shown in Fig. 10, and as the lugs are nested in the U-shaped sections the dogs drop over the stops 18 at the ends of the lugs, as illustrated in Fig. 9 whereby the lugs are locked in said U-shaped sections and the flange is securely locked to the rim of the wheel.

It will be understood that modifications, within the scope of the appended claim, may be made in the design and arrangement of the parts without departing from the spirit of the invention.

What is claimed is:

In a demountable rim for motor vehicle wheels, the combination which comprises a rim having a flange on one side integral therewith and having spaced lugs extended radially inwardly from the opposite side, said lugs having stops on one of the ends thereof, and a second flange having spaced U-shaped sections extended radially inwardly from the inner edge, said second flange positioned on the side of the rim on which the lugs are positioned and with the said U-shaped sections positioned to pass between and receive the lugs of the rim, and dogs carried by the ends of resilient arms mounted on the second flange and positioned to extend over ends of the lugs for locking the lugs in the U-shaped sections of the flange.

References Cited in the file of this patent

UNITED STATES PATENTS

| Number | Name | Date |
|---|---|---|
| 895,762 | Jeffery | Aug. 11, 1908 |
| 1,223,635 | Stinemetts | Apr. 24, 1917 |
| 1,591,819 | Hayward | July 6, 1926 |
| 1,936,745 | Areson | Nov. 28, 1933 |